(12) United States Patent
Yonehara et al.

(10) Patent No.: US 8,758,648 B2
(45) Date of Patent: Jun. 24, 2014

(54) STABILIZER OF COLOR FORMER AND USE THEREOF

(75) Inventors: Satoshi Yonehara, Kyoto (JP); Norio Inamura, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 339 days.

(21) Appl. No.: 12/933,569

(22) PCT Filed: Mar. 18, 2009

(86) PCT No.: PCT/JP2009/055296
§ 371 (c)(1),
(2), (4) Date: Sep. 20, 2010

(87) PCT Pub. No.: WO2009/116575
PCT Pub. Date: Sep. 24, 2009

(65) Prior Publication Data
US 2011/0015391 A1    Jan. 20, 2011

(30) Foreign Application Priority Data

Mar. 19, 2008  (JP) .................................. 2008-071841

(51) Int. Cl.
*C09K 15/32* (2006.01)
*C09K 15/16* (2006.01)

(52) U.S. Cl.
USPC ..................................... 252/400.62; 252/405

(58) Field of Classification Search
USPC ........................................... 252/400.62, 405
See application file for complete search history.

(56) References Cited

U.S. PATENT DOCUMENTS

| 4,384,042 | A | 5/1983 | Miike et al. |
| 4,916,058 | A | 4/1990 | Aoyama et al. |
| 5,523,214 | A | 6/1996 | Horn |
| 6,703,245 | B2 | 3/2004 | Sumitani et al. |
| 2003/0082823 | A1 | 5/2003 | Sumitani et al. |
| 2003/0157719 | A1 | 8/2003 | Samsoondar |
| 2007/0224685 | A1 | 9/2007 | Kouzuma et al. |
| 2009/0053823 | A1 | 2/2009 | Yonehara et al. |
| 2010/0112622 | A1 | 5/2010 | Yonehara et al. |

FOREIGN PATENT DOCUMENTS

| CN | 1448782 | 10/2003 |
| CN | 101023168 A | 8/2007 |
| CN | 101056650 A | 10/2007 |
| EP | 1788081 A1 | 5/2007 |
| EP | 1985670 A1 | 10/2008 |
| EP | 2108952 A1 | 10/2009 |
| GB | 1475876 | 6/1977 |
| JP | 60-33479 | 8/1985 |
| JP | 1-118768 | 5/1989 |
| JP | 4-27839 | 5/1992 |
| JP | 7-234221 | 9/1995 |
| JP | 7-289253 | 11/1995 |
| JP | 8-154672 | 6/1996 |
| JP | 8-336386 | 12/1996 |
| JP | 2000-214152 | 8/2000 |
| JP | 2000-214155 | 8/2000 |
| JP | 2000-300294 | 10/2000 |
| JP | 2002-315600 | 10/2002 |
| JP | 2004-045365 | 2/2004 |
| JP | 2004-275013 | 10/2004 |
| JP | 2004-275063 | 10/2004 |
| JP | 2004-344052 | 12/2004 |
| WO | 97/20039 | 6/1997 |
| WO | 00/50579 | 8/2000 |
| WO | 00/61732 | 10/2000 |
| WO | 02/06519 | 1/2002 |

(Continued)

OTHER PUBLICATIONS

Matsuyama N, Yamaguchi M, Toyosato M, Takayama M, Mizuno K. New enzymatic colorimetric assay for total homocysteine.Clin Chem. Dec. 2001;47(12):2155-7.*
Office Action issued in a related U.S. Appl. No. 12/524,834, dated Nov. 10, 2011.
Ducros et al., "Methods for homocysteine analysis and biological relevance of the results," Journal of Chromatography. B, Analytical technologies in the biomedical and life sciences, 781(1-2): 207-226 (2002).

(Continued)

*Primary Examiner* — Paul Zarek
(74) *Attorney, Agent, or Firm* — Morgan, Lewis & Bockius LLP

(57) ABSTRACT

The present invention provides a stabilizer that can stabilize a salt of 10-(carboxymethylaminocarbonyl)-3,7-bis(dimethylamino)phenothiazine or a derivative thereof even under the existence of moisture or under light irradiation. A compound described in at least one of (1) and (2) below is used as the stabilizer of the salt of 10-(carboxymethylaminocarbonyl)-3,7-bis(dimethylamino)phenothiazine or the derivative thereof.

(1) a surfactant having an alkyl group with a carbon number of 8 to 16
(2) at least one pigment substance selected from the group consisting of a compound represented by the following formula (I), a compound represented by the following formula (II), and a flavonoid pigment

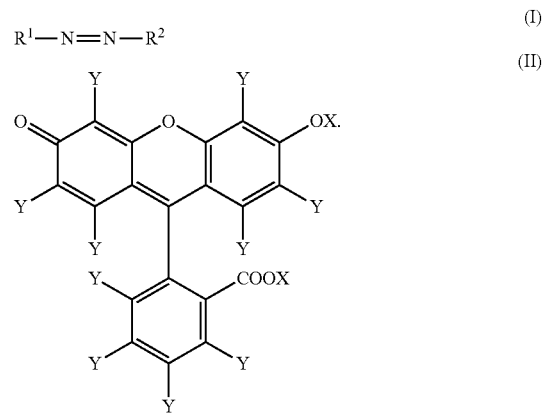

4 Claims, No Drawings

(56) References Cited

FOREIGN PATENT DOCUMENTS

| WO | 02/21142 | 3/2002 | | |
|---|---|---|---|---|
| WO | 2004/029251 | 4/2004 | | |
| WO | WO 2005/088305 | * | 9/2005 | ............ G01N 21/78 |
| WO | 2006/051110 A2 | 5/2006 | | |
| WO | 2007/083703 | 7/2007 | | |
| WO | 2008/093722 A1 | 8/2008 | | |
| WO | 2009/069309 A1 | 6/2009 | | |

OTHER PUBLICATIONS

Sakai et al., "Purification and properties of fructosyl lysine oxidase from *Fusarium oxysporum* S-1F4," Biosci. Biotech. Biochem., 59(3):487-491 (1995).

Sakaue et al., "Thermostabilization of bacterial fructosyl-amino acid oxidase by directed evolution," Applied and Environmental Microbiology, 69(I):139-145 (2003).

Extended European Search Report issued in corresponding European Patent Application No. 09722516.3 dated Mar. 8, 2012.

Final Office Action issued in related U.S. Appl. No. 12/524,834 dated Mar. 26, 2012.

Hamai, "Complex Formation in Cationic Dye-Organic Anion Systems in Aqueous Solution," Bull. Chem. Soc. Jpn. 58: 2099-2106 (1985).

Yamamoto et al., "Spectroscopic studies of the interaction between methylene blue-naphthol orange complex and anionic and cationic surfactants," Spectrochimica Act A Part A 66: 302-306 (Jul. 2006, online publication date).

Vytras, et al., "Achromatic screening of metallochromic indicators as a correction method for visual end-point location", Collection Czechoslov. Chem. Commun., 1976, vol. 41, pp. 2846-2856, particularly, Abstract and Fig. 3.

Office Action issued in related European Patent Application No. 08704155.4 dated Oct. 24, 2012.

Decision of Rejection issued in corresponding Chinese Patent Application No. 200980106670.9 dated May 27, 2013.

Extended European Search Report issued in a related European Patent Application No. 08704155.4, dated Apr. 12, 2011.

\* cited by examiner

STABILIZER OF COLOR FORMER AND USE THEREOF

TECHNICAL FIELD

The present invention relates to a stabilizer for stabilizing 10-(carboxymethylaminocarbonyl)-3,7-bis(dimethylamino) phenothiazine as a color former, a derivative thereof, or a salt thereof and a use of the stabilizer.

BACKGROUND ART

As a method for measuring (qualitatively or quantitatively) an objective component, an enzyme method using a redox reaction has been used widely. This method is, for example, a method in which an oxidizing substance is caused to be produced from an objective component to be measured, this oxidizing substance is caused to react with a color former that produces a color-developing compound by oxidation with the aid of an oxidizing enzyme, and the absorbance of developed color is measured. In this method, the degree of absorbance corresponds to the amount of the produced color-developing compound, the amount of the produced color-developing compound corresponds to the amount of the produced oxidizing substance, and the amount of the produced oxidizing substance corresponds to the amount of the objective component. That is, by detecting the developed color (the produced color-developing compound), the objective component can be measured indirectly through such a redox reaction.

As such a color former that develops color by oxidation, 10-(carboxymethylaminocarbonyl)-3,7-bis(dimethylamino) phenothiazine, which releases methylene blue as a chromophore, has been known. Methylene blue is less liable to fade in color by re-reduction, whereby this color former allows highly sensitive detection to be conducted. Thus, it is expected that the color former will be used in various analyses.

When using this color former in, for example, a redox reaction as mentioned above, the color former is stored until use as a liquid reagent (wet type) obtained by dissolving the color former in a solvent such as water, a buffer, or the like on account of ease of handling, for example. Alternatively, the color former is stored until use as a test piece (dry type) obtained by fixing the color former on a base material such as a porous body and the like so that the redox reaction can be started by simply adding a sample. However, this color former is very unstable, and there is a problem that color is developed spontaneously before starting an artificial redox reaction by adding an enzyme as described above, i.e., during storage. The cause thereof is presumed to be that, for example, in the case of a wet type, the color former becomes unstable in the solvent, and in the case of a dry type, the color former becomes unstable by absorbing moisture from the air, and the like. Furthermore, regardless of whether a wet type or a dry type, it has been seen as a problem that the color former becomes unstable to cause color to be developed spontaneously also in the case where the color former is stored with exposure to light such as ultraviolet and the like.

When spontaneous color development of the color former occurs as described above, release of methylene blue may cause an increase in background absorbance in the measurement of an absorbance at the time of actual use, resulting in degraded measurement accuracy. In particular, in the color former, the released methylene blue has a property of being less liable to fade in color as described above. Thus, while there is an advantage of high sensitivity, a chromophore (methylene blue) released by natural oxidization also is less liable to fade in color as compared with other chromophores, thus posing a problem in that the influence thereof is difficult to be avoided. When the color former is stored in the liquid state, spontaneous color development that exerts an influence on the measurement is seen within about one day, and it would be difficult to use the color former as a reagent for an analysis within about three days, for example (Patent document 1).

In order to prevent such an influence of spontaneous color development, it is required to prepare a reagent of the color former every time a measurement is performed. This, however, leads to a complicated operation and also to a cost increase.

Patent document 1: JP 4(1992)-27839 A

DISCLOSURE OF INVENTION

Hence, the present invention is intended to provide a stabilizer that can stabilize 10-(carboxymethylaminocarbonyl)-3,7-bis(dimethylamino)phenothiazine, a derivative thereof, or a salt thereof, for example, even in the presence of moisture or exposure to light.

The stabilizer of the present invention is a stabilizer for stabilizing 10-(carboxymethylaminocarbonyl)-3,7-bis(dimethylamino)phenothiazine, a derivative thereof, or a salt thereof, containing a compound described in at least one of (1) and (2):

(1) a surfactant having an alkyl group with a carbon number of 8 to 16; and (2) at least one pigment substance selected from the group consisting of a compound represented by the following formula (I), a compound represented by the following formula (II), and a flavonoid pigment:

$$R^1-N=N-R^2 \qquad (I),$$

where in the formula (I), $R^1$ is

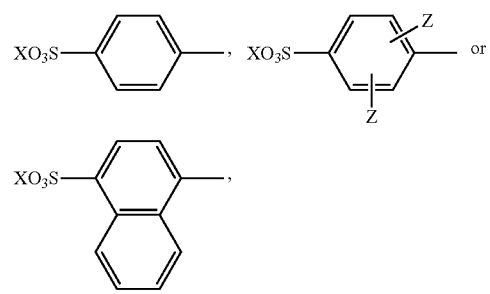

and $R^2$ is

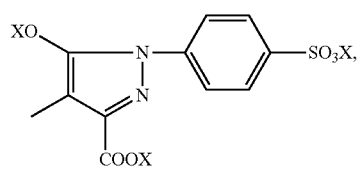

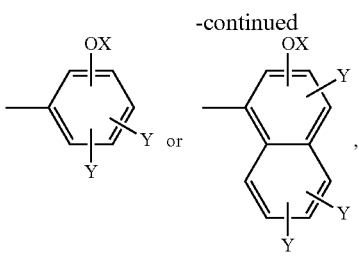

where in $R^1$ and $R^2$,

X is hydrogen, halogen, sodium, or potassium, and the respective Xs may be identical to or different from each other, Y is hydrogen or $SO_3X$, and the respective Ys may be identical to or different from each other, and Z is hydrogen, a methyl group, or a methoxy group, and the respective Zs may be identical to or different from each other,

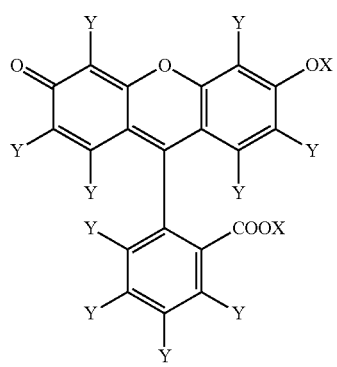

where in the formula (II),

X is hydrogen, halogen, sodium, or potassium, and the respective Xs may be identical to or different from each other, and Y is hydrogen, halogen, sodium, or potassium, and the respective Ys may be identical to or different from each other.

A color-forming reagent of the present invention is a color-forming reagent containing 10-(carboxymethylaminocarbonyl)-3,7-bis(dimethylamino)phenothiazine, a derivative thereof, or a salt thereof, wherein the color-forming reagent further contains the stabilizer of the present invention.

A stabilizing method of the present invention is a method for stabilizing 10-(carboxymethylaminocarbonyl)-3,7-bis(dimethylamino)phenothiazine, a derivative thereof, or a salt thereof. The method includes causing 10-(carboxymethylaminocarbonyl)-3,7-bis(dimethylamino)phenothiazine, the derivative thereof or the salt thereof to be present with the stabilizer of the present invention.

A storage method of the present invention is a method for storing 10-(carboxymethylaminocarbonyl)-3,7-bis(dimethylamino)phenothiazine, a derivative thereof, or a salt thereof, wherein the 10-(carboxymethylaminocarbonyl)-3,7-bis(dimethylamino)phenothiazine, the derivative thereof, or the salt thereof is stored in a state of being stabilized by the stabilizing method of the present invention.

A kit for conducting a color-developing reaction of the present invention includes, as a color former, 10-(carboxymethylaminocarbonyl)-3,7-bis(dimethylamino)phenothiazine, a derivative thereof, or a salt thereof, wherein the kit further includes the stabilizer of the present invention.

In the present invention, the 10-(carboxymethylaminocarbonyl)-3,7-bis(dimethylamino)phenothiazine, the derivative thereof, or the salt thereof also is referred to as "color former" unless otherwise stated.

The inventors of the present invention found, as a result of earnest studies, that, by causing a compound described in (1) or (2) to be present with the color former, spontaneous color development of the color former can be suppressed. Consequently, by using the stabilizer of the present invention, the spontaneous color development is suppressed and the color former can be stabilized, thereby allowing the storage of the color former, which has been difficult heretofore. In addition, according to the stabilizing method of the present invention, improved stabilization can be achieved by, for example, preventing spontaneous color development of the color former allowing high sensitive measurement to be conducted, so that the applicable range of the color former can be further extended. Therefore, it can be said that the present invention is very useful, for example, in clinical examinations and the like.

In the present invention, "stabilizing the color former" means, for example, suppressing spontaneous color development of the color former and maintaining the function of the color former as a color former. The stabilizer of the present invention also can be referred to as a spontaneous color development suppressant of the color former because it can suppress the spontaneous color development of the unstable color former.

In the present invention, the color former is, as described above, 10-(carboxymethylaminocarbonyl)-3,7-bis(dimethylamino)phenothiazine, a derivative thereof, or a salt thereof. The 10-(carboxymethylaminocarbonyl)-3,7-bis(dimethylamino)phenothiazine is represented by the following formula. It releases methylene blue by oxidization, whereby color is developed. The salt of 10-(carboxymethylaminocarbonyl)-3,7-bis(dimethylamino)phenothiazine is, for example, available from Wako Pure Chemical Industries, Ltd. as a product named DA-67. The derivative of 10-(carboxymethylaminocarbonyl)-3,7-bis(dimethylamino)phenothiazine is not particularly limited, as long as it releases, for example, color developing methylene blue or a color developing derivative of the methylene blue by oxidization. Specific examples include derivatives represented by the following formula in which the hydrogen atom is substituted by halogen, a hydroxyl group, or the like. In addition, the salt is not particularly limited, and examples of a counter ion thereof include univalent metal ions such as sodium, potassium, and the like.

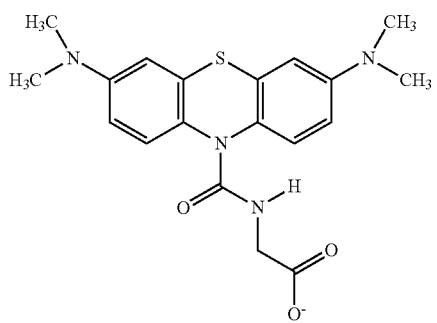

The color former generally is used when an objective component in a sample is to be detected utilizing a redox reaction. When the color former is added to, for example, a reaction system, methylene blue, which is a phenothiazine derivative pigment, is produced (released) by a redox reaction of the color former with the oxidizing substance in the reaction system. Since the amount of this released methylene blue corresponds to the amount of the oxidizing substance, the presence or absence of the oxidizing substance or the amount of the same in the reaction system can be determined by detecting the presence or absence of the methylene blue or the amount of the same. The oxidizing substance may be produced from the objective component to be detected by a redox reaction, for example. When the objective component is an oxidizing substance, the objective component may be caused to react with the color former directly, or another oxidizing substance further may be caused to be produced from the objective component, and this oxidizing substance may be caused to react with the color former.

The stabilizer of the present invention is, as described above, a stabilizer for stabilizing the color former, containing a compound described in at least one of (1) and (2):

(1) a surfactant having an alkyl group with a carbon number of 8 to 16; and (2) at least one pigment substance selected from the group consisting of a compound represented by the following formula (I), a compound represented by the above formula (II), and a flavonoid pigment.

The stabilizer of the present invention further may contain, for example, a compound described in at least one of (3) and (4):

(3) quaternary ammonium having a hydrocarbon group with a carbon number of 12 or higher or a salt thereof; and (4) β-cyclodextrin or a derivative thereof.

It is presumed that the surfactant described in (1) suppresses the release of methylene blue from the color former by binding hydrophobically with a phenothiazine backbone of the color former. Further, it is presumed that the pigment substance described in (2) suppresses the release of methylene blue from the color former by acting on a dimethylamino group at 3-position and 7-position in the phenothiazine backbone. It is to be noted that the present invention is not at all limited by these mechanisms.

It is presumed that the quanternary ammonium described in (3) suppresses the release of methylene blue from the color former by binding ionically with a carbonyl group in the color former and binding hydrophobically with the phenothiazine backbone of the color former. Further, it is presumed that the β-cyclodextrin described in (4) suppresses the release of methylene blue from the color former by conjugating the color former. It is to be noted that the present invention is not at all limited by these mechanisms.

Hereinafter, each of the compounds described in (1), (2), (3), and (4) will be explained.

(1) Surfactant

In the present invention, the surfactant is a surfactant having an alkyl group with a carbon number of 8 to 16. Examples of the alkyl group include: a substituted alkyl group such as a straight-chain alkyl group, a branched-chain alkyl group, a cycloalkyl group, or the like; and an alkoxyalkyl group; and the like, and also include: a straight-chain acyl group; a branched-chain acyl group; and the like. Examples of the surfactant include compounds represented by the following formula (IV).

$$R-X \quad (IV)$$

In the formula (IV), R is, for example, an alkyl group or a substituted alkyl group, or an acyl group or a substituted acyl group, with a carbon number of 8 or higher or 9 or higher. Specific examples of R include: a straight-chain alkyl group or a straight-chain acyl group, with a carbon number of 9 to 16; a branched-chain alkyl group or a branched-chain acyl group, with a carbon number of 10 to 40 and with a main chain carbon number of 9 to 16; a straight-chain alkyl group substituted with cycloalkyl (for example, the carbon number of the cycloalkyl is 3 to 8, and the carbon number of the straight chain excluding the cycloalkyl is 4 to 13); or the like. Examples of the cycloalkyl include: cyclohexyl; cyclopentyl; cyclobutyl; and the like.

In the formula (IV), X is a sugar residue, and for example, X preferably is a monosaccharide residue or a disaccharide residue. Examples of the monosaccharide include: mannoside; glucoside; thioglucoside; and the like, and examples of the disaccharide include: maltoside; fructopyranosyl-glucopyranoside; thiomaltoside; saccharose; and the like. Structures of theses sugars may be any of α, β, D, and L. In addition, hydrogen binding to a cyclic structure of a sugar or hydrogen of OH group may be, for example, substituted with a univalent metal such as Na, K, or the like, halogen, or the like. It is to be noted that, in the present invention, an atom mediating a bond between the R and a cyclic structure of a sugar residue (for example, —O—, —S— or the like) is a component of the sugar residue.

Specific examples of the surfactant in the present invention include:

n-dodecyl-β-D-maltoside(n-dodecyl-β-D-maltopyranoside);

6-cyclohexylhexyl-β-D-maltoside;

sucrose monolaurate(β-D-fructopyranosyl-α-D-glucopyranoside monododecanoate);

n-decyl-β-D-maltoside(n-decyl-β-D-maltopyranoside);

n-nonyl-β-D-thiomaltoside(n-nonyl-β-D-thiomaltopyranoside);

5-cyclohexylpentyl-β-D-maltoside;

undecyl-β-D-maltoside;

n-dodecyl-α-D-maltoside;

hexadecyl-β-D-maltoside;

3-oxatridecyl-α-D-mannoside; and the like. Chemical formulae of these compounds are shown below. In the present invention, the surfactants may be used alone or in a combination of two or more of them.

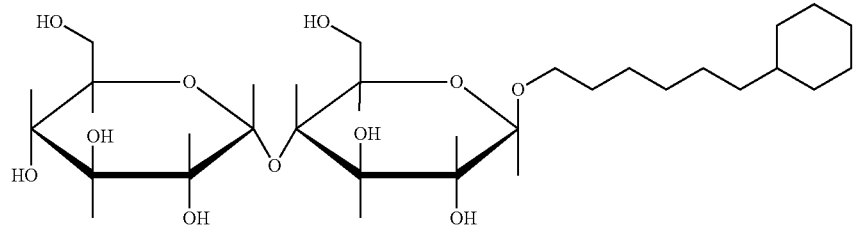

6-Cyclohexylhexyl-β-D-maltoside

-continued
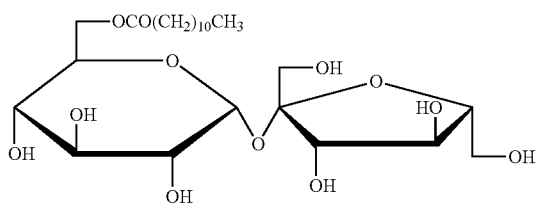
Sucrose monolaurate
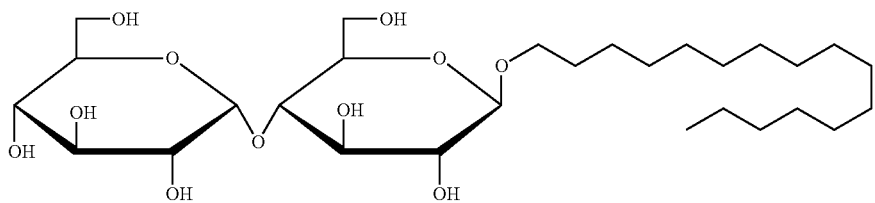
n-Hexadecyl-β-D-maltoside
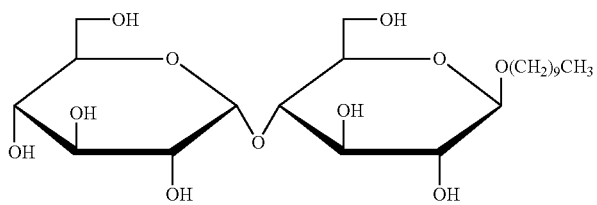
n-Decyl-β-D-maltoside
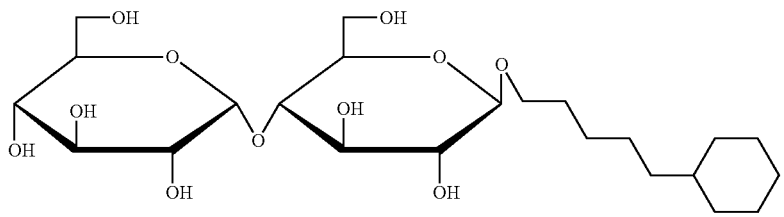
5-Cyclohexylpentyl-β-D-maltoside
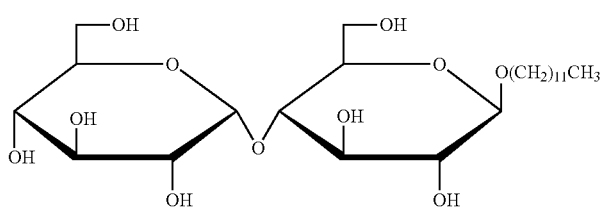
n-Dodecyl-β-D-maltoside
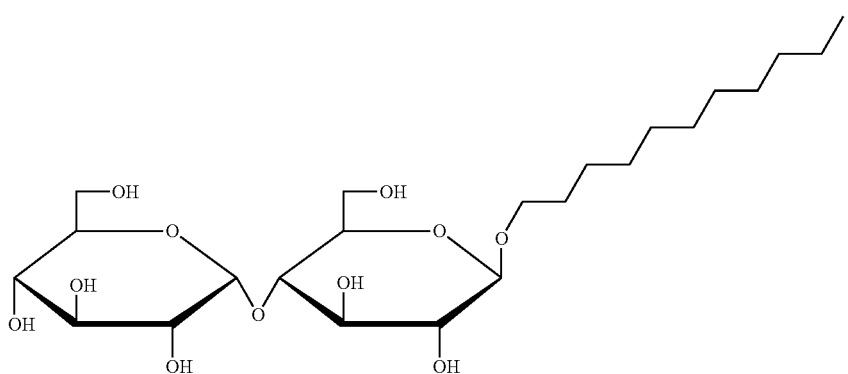
Undecyl-β-D-maltoside

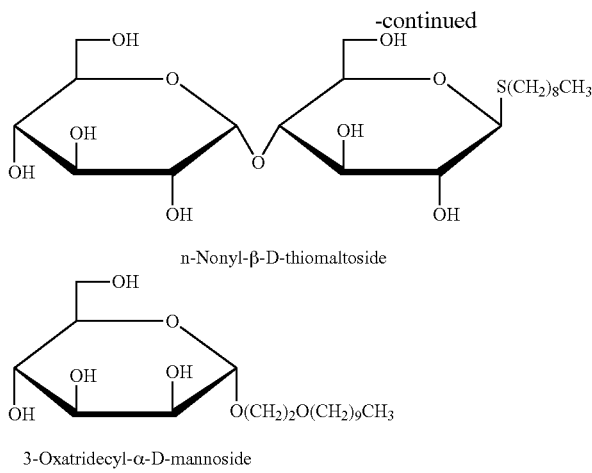

n-Nonyl-β-D-thiomaltoside

3-Oxatridecyl-α-D-mannoside

Among them, n-dodecyl-β-D-maltoside, sucrose monolaurate, hexadecyl-β-D-maltoside, and the like, in which the carbon number of R (an alkyl group or an acyl group) in the formula (IV) is 12 or higher are preferred. In addition, when the carbon numbers of Rs are the same (for example, an alkyl group or an acyl group, with a carbon number identical to each other), R is preferred to be an acyl group. As the surfactant, for example, n-dodecyl-β-D-maltoside(n-dodecyl-β-D-maltopyranoside) is preferred.

(2) Pigment Substance

The compound described in (2) in the present invention is at least one pigment substance selected from the group consisting of a compound represented by the following formula (I), a compound represented by the following formula (II), and a flavonoid pigment.

As the pigment substance, for example, among the compound represented by the following formula (I), the compound represented by the following formula (II), and the flavonoid pigment, any one of them, a combination of any two of them, or a combination of all three of them may be used.

$$R^1-N=N-R^2 \quad (I)$$

In the formula (I), $R^1$ is

and $R^2$ is

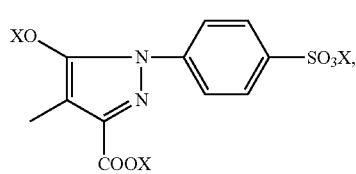

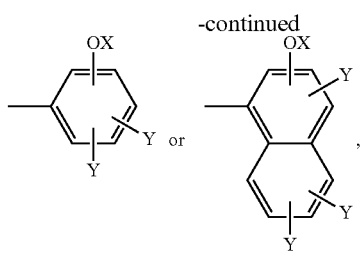

where in $R^1$ and $R^2$,

X is hydrogen, halogen, or a univalent metal (for example, sodium or potassium), and the respective Xs may be identical to or different from each other, Y is hydrogen or $SO_3X$, and the respective Ys may be identical to or different from each other, and Z is hydrogen, a methyl group, or a methoxy group, and the respective Zs may be identical to or different from each other. In addition, in each formula, hydrogen may be substituted with halogen, a univalent metal (sodium, potassium, or the like), or the like (hereinafter the same).

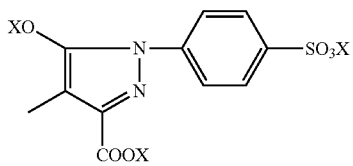

can be, for example,

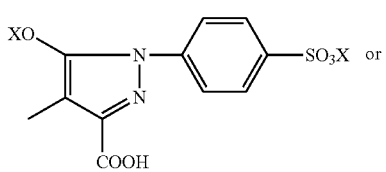

-continued

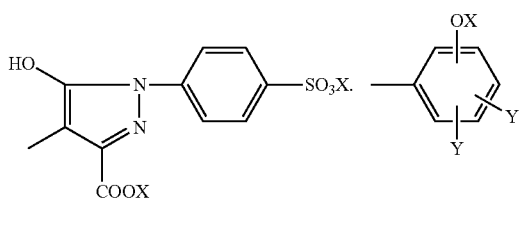

can be, for example,

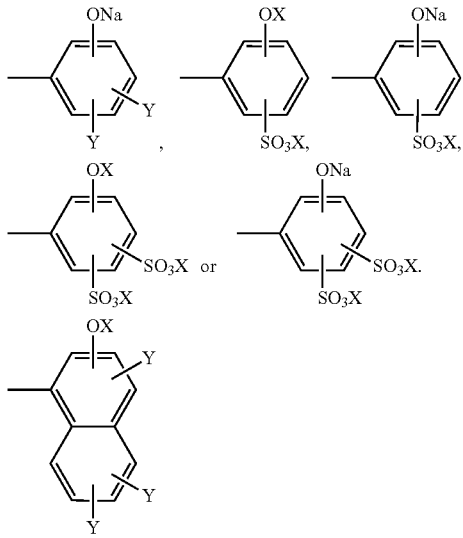

can be, for example,

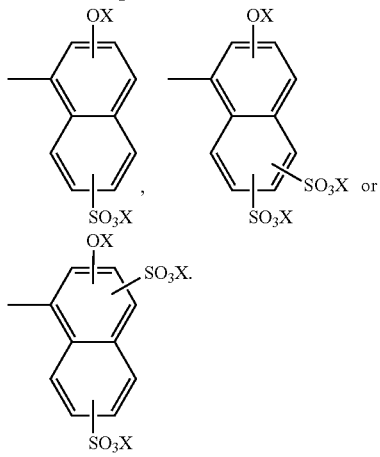

Specific examples of the pigment substance represented by the formula (I) include the following compounds.

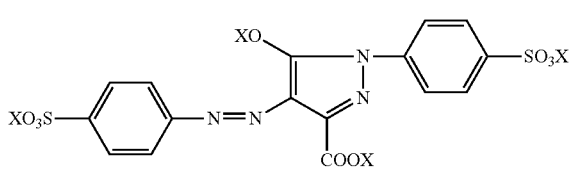

(1)

-continued

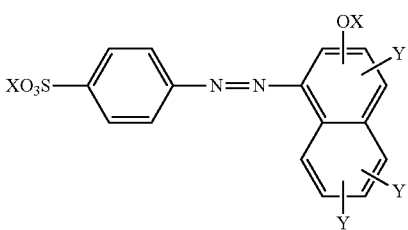

(2)

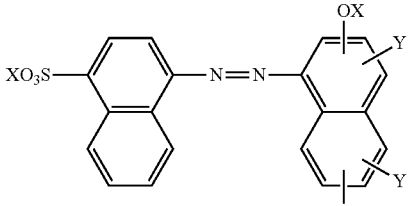

(3)

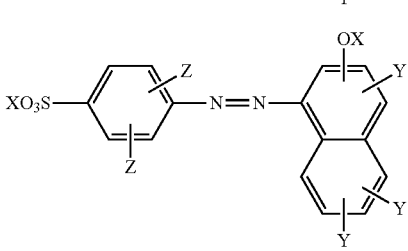

(4)

$R^2$ in the formula (2) is, for example, preferred to be represented by the following formula (5), $R^2$ in the formula (3) is, for example, preferred to be represented by the following formula (6), and Zs in the formula (4) are, for example, preferred to be a methyl group and a methoxy group respectively and $R^2$ is preferred to be represented by the following formula (5).

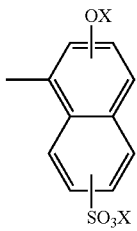

(5)

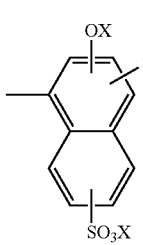

(6)

Examples of the pigment substance represented by the formula (I) include:

5-hydroxy-1-(4-sulfophenyl)-4-(4-sulfophenylazo)pyrazole-3-carboxylic acid or salts thereof (for example, trisodium salt);

6-hydroxy-5-(4-sulfophenylazo)-2-naphthalenesulfonic acid or salts thereof (for example, disodium salt);

3-hydroxy-4-(4-sulfonaphthylazo)-2,7-naphthalenedisulfonic acid or salts thereof (for example, trisodium salt);

6-hydroxy-5-[(2-methoxy-5-methyl-4-sulfonatophenyl) diazenyl]naphthalene-2-sulfonic acid or salts thereof (for example, disodium salt);

7-hydroxy-8-(4-sulfonaphthylazo)-1,3-naphthalenedisulfonic acid, salts thereof (for example, trisodium salt), or hydrates thereof (for example, 1·1/2 hydrates); and the like. As these salts and hydrates, for example, commercially available products can be used, and these pigment substances may be edible or non-edible. Specific examples include the following.

Yellow No. 4
Another name: Tartrazine, FD&C Yellow No. 5
Chemical name: 5-hydroxy-1-(4-sulfonatophenyl)-4-[(4-sulfonatophenyl)diazenyl]-1H-pyrazole-3-carboxylic acid trisodium salt Yellow No. 5
Another name: Sunset Yellow FCF
Chemical name: 6-hydroxy-5-(4-sulfonatophenylazo)-2-naphthalene-2-sulfonic acid disodium salt Red No. 2
Another name: Amaranth
Chemical name: 3-hydroxy-4-(4-sulfonato-1-naphthylazo)-2,7-naphthalenedisulfonic acid trisodium Red No. 40
Another name: Allura Red AC
Chemical name: 6-hydroxy-5-[(2-methoxy-5-methyl-4-sulfonatophenyl)diazenyl]naphthalene-2-sulfonic acid disodium Red No. 102
Another name: New Coccine
Chemical name: 7-hydroxy-8-(4-sulfonato-1-naphthylazo)-1,3-naphthalenedisulfonic acid trisodium 1·1/2 hydrate The pigment substances represented by the formula (I) may be used alone or in a combination of two or more of them.

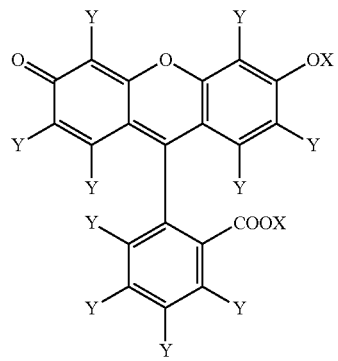

(II)

In the formula (II),

X is hydrogen, halogen, or a univalent metal (for example, sodium or potassium), and the respective Xs may be identical to or different from each other, and Y is hydrogen, halogen, or a univalent metal (for example, sodium, or potassium), and the respective Ys may be identical to or different from each other.

In addition, examples of the pigment substance represented by the formula (II) include:

3',6'-dihydroxy-2',4',5',7'-tetraiodospiro[isobenzofuran-1(3H),9'-[9H]xanthene]-3-one or salts thereof (for example, disodium salt) or hydrates thereof (for example, monohydrate);

3',6'-dihydroxy-2',4',5',7'-tetrabromo-4,5,6,7,-tetrachlorospiro[isobenzofuran-1(3H),9'-[9H]xanthene]-3-one or salts thereof (for example, disodium salt);

4,5,6,7-tetrachloro-3',6'-dihydroxy-2',4',5',7'-tetraiodospiro[isobenzofuran-1(3H),9'-[9H]xanthene]-3-one or salts thereof (for example, disodium salt);

2,4,5,7-tetrabromo-3,6-dihydroxyxanthene-9-spiro-1'-3H-isobenzofuran-3'-one or salts thereof (for example, disodium salt);

3,6-dihydroxyxanthene-9-spiro-1'-3'H-isobenzofuran-3'-one or salts thereof (for example, disodium salt); and the like. As salts or hydrates of these pigment substances, for example, commercially available products can be used, and theses pigment substances may be edible or non-edible. Specific examples thereof include the followings.

Red No. 3
Another name: Erythrosine
Chemical name: 2',4',5',7'-tetraiodo-3',6'-dihydroxyxanthene-9-spiro-1'-3H-isobenzofuran-3'-one disodium Red No. 104
Another name: Red No. 104-1, Phloxine B
Chemical name: 2,4,5,7-tetrabromo-3,6-dihydroxyxanthene-9-spiro-1'-4',5',6',7'-tetrachlor-3'H-isobenzofuran-3'-one disodium Red No. 105
Another name: Red No. 105-1, Rose Bengal
Chemical name: 2,4,5,7-tetraiodo-3,6-dihydroxyxanthene-9-spiro-1'-4',5',6';7'-tetrachlor-3'H-isobenzofuran-3'-one dipotassium Red No. 230-1
Another name: Eosin, Acid Red 87
Chemical name: 2',4',5',7'-tetrabromo-3',6'-dihydroxyxanthene-9-spiro-1'-3H-isobenzofuran-3'-one disodium Yellow No. 202-1
Another name: Uranine
Chemical name: 3,6-dihydroxyxanthene-9-spiro-1'-3'H-isobenzofuran-3'-one disodium The pigment substances represented by the formula (II) may be used alone or in a combination of two or more of them.

Examples of the flavonoid pigment include: a flavonoid; a flavonoid polymer; and the like. Examples of the flavonoid include a commercially available persimmon pigment (Japanese persimmon color from Diospyros kaki THUMB.) and the like. The persimmon pigment generally contains, as a main component, a flavonoid extracted from fruit. In addition, examples of the flavonoid polymer include a commercially available cacao pigment (Cacao color from Theobroma cacao LINNE.) and the like. The cacao pigment generally contains, as a main component, a polymer of anthocyanin, which is one type of flavonoid. The polymer of anthocyanin is, for example, represented by the following formula. In the following formula, n is the degree of polymerization. n is not particularly limited, and is, for example, 5 or higher, preferably 6 or higher. The upper limit of n is not particularly limited. R is glycoside galacturonic acid.

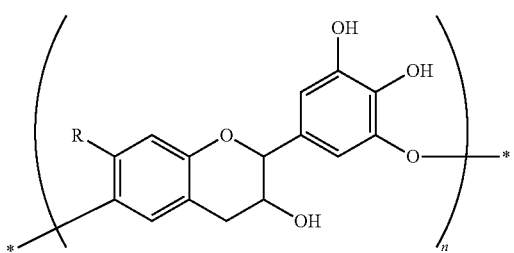

The flavonoid pigments may be used alone or in a combination of two or more of them, for example.

In the present invention, the pigment substance is particularly preferred, for example in the case where there is a possibility of storing the color former exposed to light. When this pigment substance is present with the color former, it is considered that, for example, light irradiation to the color former is blocked by the presence of the pigment substance. The color former is unstable toward light and there is a risk that color might be developed spontaneously by light irradiation. Thus when it is considered that the color former might be stored under such conditions, the pigment substance preferably is used as the stabilizer of the present invention.

(3) Quaternaiy Ammonium or Salt Thereof

The compound described in (3) in the present invention is, as described above, quaternary ammonium having a hydrocarbon group with a carbon number of 12 or higher or a salt thereof. Hereinafter, it is referred to as "quaternary ammonium".

The carbon number of the hydrocarbon group may be any number as long as the number is 12 or higher, and examples thereof include 13, 14, 15, 16, 17, 18, 19, 20, or the like. The carbon number is preferably 14 or higher, 16 or higher, or 17 or higher, and the upper limit thereof is not limited. Examples of the range of the carbon number include the range of 14 to 18 and the range of 16 to 18.

In the quaternary ammonium, for example, among four hydrocarbon groups linking to N, any of them may be the hydrocarbon group with the above described carbon number. In the quaternary ammonium, for example, among the four hydrocarbon groups, only one of them, two or more of them, three or more of them, or all of them may be the hydrocarbon group with the above described carbon number. Among them, preferred is the quaternary ammonium in which one in four of the hydrocarbon groups is the hydrocarbon group with the above described carbon number.

Examples of the hydrocarbon group include: straight-chain or branched-chain alkyl; cyclic alkyl; straight-chain, branched-chain, or cyclic alkyl having a substituent(s); aryl having a substituent(s); and the like. The substituents may be, for example, identical to or different from each other. Examples of the substituent include: halogen; straight-chain or branched-chain alkyl; phenyl; hydroxy; straight-chain or branched-chain C1-C6 alkoxy; and the like. Examples of the aryl include phenyl and the like. The cyclic alkyl can be, for example, cyclohexyl or the like. Alternatively, the hydrocarbon group may be, for example, straight-chain or branched-chain alkylcarbonyl or the like instead of them.

Specific examples of the quaternary ammonium include:
benzethonium;
stearyltrimethylammonium;
cetyltrimethylammonium;
hexadecyltrimethylammonium;
benzalkonium;
benzyldimethyltetradecylammonium;
myristyltrimethylammonium;
lauryltrimethylammonium;
dodecyltrimethylammonium;
coconut amine acetate; and the like.

In addition, examples of the salt of the quaternary ammonium include: a chloride salt; a bromide salt; and the like, and among them, the chloride salt or the bromide salt is preferred. Specific examples of the chloride salt and the bromide salt include: benzethonium chloride; stearyltrimethylammonium chloride; cetyltrimethylammonium chloride, hexadecyltrimethylammonium chloride; benzalkonium chloride; benzyldimethyltetradecylammonium chloride; myristyltrimethylammonium chloride; lauryltrimethylammonium chloride; dodecyltrimethylammonium chloride; coconut amine acetate chloride; benzethonium bromide; stearyltrimethylammonium bromide; cetyltrimethylammonium bromide, hexadecyltrimethylammonium bromide; benzalkonium bromide; benzyldimethyltetradecylammonium bromide; myristyltrimethylammonium bromide; lauryltrimethylammonium bromide; dodecyltrimethylammonium bromide; coconut amine acetate bromide; and the like.

These compounds may be used alone or in a combination of two or more of them. In addition, quaternary ammonium having the hydrocarbon group(s) with the above described carbon number may be, for example, used in a combination with amine having a hydrocarbon group with a different carbon number from the above described carbon number or used in a combination with quaternary ammonium having a hydrocarbon group with a carbon number of 11 or lower, and the like.

(4) β-Cyclodextrin or Derivative Thereof

The compound described in (4) in the present invention is, as described above, β-cyclodextrin or a derivative thereof (hereinafter referred to as "β-cyclodextrin"). Examples of the derivative include:
maltosyl-β-cyclodextrin;
glucosyl-β-cyclodextrin;
carboxymethyl-β-cyclodextrin;
dimethyl-β-cyclodextrin;
monoamino-β-cyclodextrin;
2-hydroxypropyl-β-cyclodextrin;
methyl-β-cyclodextrin;
glucuronylglucosyl-β-cyclodextrin;
heptakis(2,6-di-O-methyl)-β-cyclodextrin;
tri-O-methyl-β-cyclodextrin;
succinyl-β-cyclodextrin;
sulfopropyl-β-cyclodextrin;
succinylhydroxypropyl-β-cyclodextrin;
triacetyl-β-cyclodextrin; and the like. In the present invention, the β-cyclodextrins may be used alone or in a combination of two or more of them.

Each of the compounds in the present invention may be, for example, an isomer thereof such as a tautomer thereof or a stereoisomer (for example: a geometric isomer, a conformational isomer, an enantiomer, and the like) thereof, and the like. In addition, when each of the compound is a salt, the counter ion thereof is not particularly limited, and examples thereof include: anions (negative ions) such as a hexafluorophosphate ion ($PF_6^-$), a tetrafluoroborate ion ($BF_4^-$), a hydroxide ion ($OH^-$), an acetate ion, a carbonate ion, a phosphate ion, a sulfate ion, a nitrate ion, a halide ion, a hypohalite ion, a halite ion, a halate ion, a perhalate ion, a trifluoromethanesulfonate ion ($OSO_2CF_3^-$), a tetrakis pentafluorophenyl borate ion ($B(C_6F_5)_4^-$), and the like. Examples of the halide ion include: a fluoride ion ($F^-$); a chloride ion ($Cl^-$); bromide ion ($Br^-$); iodide ion ($I^-$); and the like. Examples of the hypohalite ion include: a hypofluorite ion; a hypochlorite ion; a hypobromite ion; a hypoiodite ion; and the like. Examples of the halite ion include: a fluorite ion; a chlorite ion; a bromite ion; an iodite ion; and the like. Examples of the halate ion include: a fluorate ion; a chlorate ion; a bromate ion; an iodate ion; and the like. Examples of the perhalate ion include: a perfluorate ion; a perchlorate ion; a perbromate ion; a periodate ion; and the like.

In the present invention, "halogen" means any halogen element. Examples of the halogen include: fluorine; chlorine; bromine; iodine; and the like. Furthermore, in the present invention, "alkyl group" is not particularly limited as long as, for example, a carbon number is not limited as described above. Examples of the alkyl group include: a methyl group; an ethyl group; a n-propyl group; an isopropyl group; a n-butyl group; an isobutyl group; a sec-butyl group; a tert-buthyl group; a pentyl group; a hexyl group; a heptyl group; an octyl group; a nonyl group; a decyl group; an undecyl group; a dodecyl group; a tridecyl group; a tetradecyl group; a pentadecyl group; a hexadecyl group; a heptadecyl group; an octadecyl group; a nonadecyl group; an icosyl group; and the like. In addition, in the present invention, when a substituent or the like has an isomer, the isomer may be any isomer unless otherwise limited. For example, when the substituent is merely referred to as "propyl group", the isomer thereof may be either a n-propyl group or an isopropyl group. For example, when the substituent is merely referred to as "butyl group", the isomer may be any of a n-butyl group, an isobutyl group, a sec-butyl group, and a tert-butyl group.

The stabilizer of the present invention may contain a compound described in either one of (1) and (2) or both of them, for example. In addition, the stabilizer of the present invention further may contain a compound described in at least one of (3) and (4) or both of them. When the stabilizer of the present invention contains, for example, compounds described in two or more of (1) to (4), a combination of the compounds is not particularly limited, and examples thereof include a combination of the compounds described in (2) and (3), a combination of the compounds described in (2) to (4), a combination of the compounds described in (1) to (3), a combination of the compounds described in (1) to (4), and the like. As the combination of the compounds described in (2) and (3), for example, a combination of tartrazine and at least one of hexadecyltrimethylammonium and dodecylhexadecylammonium chloride can be shown as an example. In addition, the combination of the compounds described in (2) to (4) can be, for example a combination of: at least one of hexadecyltrimethylammonium and dodecylhexadecylammonium chloride, tertradine, and at least one selected from the group consisting of 2-hydroxypropyl-β-cyclodextrin, β-cyclodextrin, maltosyl-β-cyclodextrin, glucosyl-β-cyclodextrin, and glucuronylglucosyl-β-cyclodextrin. In addition, the combination of the compounds described in (1) to (3) can be, for example, a combination of n-dodecyl-α,β-maltoside, tertradine, and hexadecyltrimethylammonium. The combination of the compounds described in (1) to (4) can be, for example, a combination of n-dodecyl-α,β-D-maltoside, tertradine, at least one of hexadecyltrimethylammonium and dodecyltrimethylammonium, and 2-hydroxypropyl-β-cyclodextrin.

The form of the stabilizer is not particularly limited, and the stabilizer may be, for example, a liquid (wet type) or a dry substance (thy type).

A method for using the stabilizer of the present invention is not particularly limited, as long as the stabilizer is caused to be present with the color former. It is preferable to cause the stabilizer to be present with the color former especially when the color former is stored until use. When the color former is stored as a wet type, the stabilizer of the present invention may be added to a solvent to which the color former is added, for example. Note here that the order of adding the color former and the stabilizer to the solvent is not particularly limited. In addition, when the color former is stored as a dry type, for example, the dry-type color former may be mixed with the thy-type stabilizer, or a solvent containing the color former and the stabilizer may be dried to provide a dry-type mixture. In addition, the stabilizer of the present invention can be used in the same manner as a color-forming reagent of the present invention to be described later.

The stabilizer of the present invention may contain, instead of the compound described in at least one of (1) and (2), the compounds described in (3) and (4). In this case, the stabilizer may contain the compound described in at least one of (1) and (2) besides the compounds described in (3) and (4). The composition of the stabilizer is the same as described above, except that the compounds described in (3) and (4) are used.

<Color-Forming Reagent>

A color-forming reagent of the present invention is a reagent allowing the color former to be stored. The color-forming reagent contains the color former and the stabilizer of the present invention.

The color-forming reagent of the present invention may contain, as the stabilizer, a compound described in at least one of (1) and (2). Specifically, for example, the color-forming reagent may contain a compound described in either one of (1) and (2) or both of them. The color-forming reagent of the present invention further may contain a compound described in either one of (3) and (4) or both of them. In addition, each of the compounds described in (1) to (4) may contain one kind of compound or may contain two or more kinds of compounds having, for example, substituents or carbon numbers different from each other.

When the color-forming reagent of the present invention contains the compounds described in two or more of (1) to (4), a combination thereof is not particularly limited and examples of the combination include, for example, a combination of the compounds described in (2) and (3), a combination of the compounds described in (2) to (4), a combination of the compound described in (1) to (3), a combination of the compounds described in (1) to (4), and the like.

In the color-forming reagent of the present invention, the ratio of the stabilizer of the present invention to be added relative to the color former is not particularly limited, and preferably, the molar ratio (A: B) between the color former (A) and the stabilizer (B) is in the range of 1:1 to 1:1,000,000, for example.

As a specific example, the molar ratio (A:B1) between the color former (A) and the surfactant (B1) described in (1) is preferably in the range of 1:2 to 1:50,000, for example. The molar ratio (A:B2) between the color former (A) and the pigment substance (B2) described in (2) is preferably in the range of 1:1 to 1:100,000, more preferably in the range of 1:2 to 1:50,000, for example.

The molar ratio (A:B3) between the color former (A) and the quaternary ammonium (B3) described in (3) is preferably in the range of 1:1 to 1:100,000, more preferably in the range of 1:2 to 1:50,000, for example. The molar ratio (A:B4) between the color former (A) and β-cyclodextrin (B4) described in (4) is preferably in the range of 1:1 to 1:100,000, more preferably in the range of 1:2 to 1:50,000, for example.

When the color-forming reagent is a dry reagent, it can be, for example, a dry substance and the like in which the color former is present with the stabilizer. The dry reagent, such a dry-type color-forming reagent, can be prepared by dissolving the color former and the stabilizer of the present invention in a solvent such as described above and then removing the solvent. The dry-type color-forming reagent may be, for example, in a powder form and contained in a container, or, for example, may be in a state of being carried by a carrier or the like. The latter can be a test chip and the like, for example. Specifically, the test chip can be prepared by, for example, preparing the liquid reagent by dissolving the color former and the stabilizer in the solvent, applying the liquid reagent in a desired area of a substrate of the chip, and then removing the solvent. The substrate of the test chip is not particularly limited and examples thereof include a filter paper, a porous body, a plastic substrate, and the like.

For example; the color-forming reagent of the present invention may be further caused to coexist with ethylenediaminetetraacetic acid (EDTA), diethylenetriaminepentaacetic acid (DTPA), a chelator such as trans-1,2-diaminocyclohexane-N,N,N',N'-tetraacetic acid (CyDTA), O,O'-bis(2-aminoethyl)ethyleneglycol-N,N,N',N'-tetraacetic acid (GEDTA), nitrilotriacetic acid (NTA), or the like, sodium azide, and the like. By causing the color-forming reagent to be present with these substances, the color-forming reagent further can be stabilized. In addition, among these substances, one of them or two or more of them may be caused to be present with the color-forming reagent.

In addition, the color-forming reagent of the present invention optionally may contain, for example, an additive required for a color-developing reaction (redox reaction) of the color former depending on the intended use of the color-forming reagent. Examples of the additive include: an enzyme such as peroxidase (POD), oxidase, protease, or the like; a buffer; a stabilizer of the enzyme; a solvent such as described above; and the like.

The form of the color-forming reagent is not particularly limited, and it may be a liquid reagent (wet type) or a dry reagent (dry type).

When the color-forming reagent is a liquid reagent, the concentration of the color former in the color-forming reagent is, for example, in the range of 1 to 10,000 μmol/L, preferably in the range of 5 to 1,000 μmol/L. Note here that the concentrations of the color former and the stabilizer in the color-forming reagent of the present invention are not particularly limited and may be set so as to be required concentrations, respectively, for example, when mixing them with a sample, a reaction system, or the like. The color-forming reagent is, for example, diluted preferably by a factor in the range of 1.2 to 100, more preferably by a factor in the range of 2 to 20 by addition to the reaction system.

When the color-forming reagent is a liquid reagent, the liquid reagent can be prepared, for example, by dissolving, suspending, or dispersing (hereinafter also referred to as "dissolving or the like") the color former and the stabilizer in a solvent. The solvent is not particularly limited and examples thereof include aqueous solvents such as, for example, water, buffers, and the like. In addition, a mixed solvent of an aqueous solvent and an organic solvent, or the like also can be used as the solvent. As the buffer, generally used buffers can be used and examples thereof include: a Tris buffer; a Tris-HCl buffer; a MES buffer; a MES-Tris buffer, a MOPS buffer; a MOPS-Tris buffer; an ADA buffer; a Bis-Tris buffer; a PIPES buffer; a phosphate buffer; a citrate buffer; a HEPES buffer; a TAPS buffer; a glycylglycine buffer; a glycinamide buffer; and the like. The concentration of the buffer is, for example, in the range of 1 to 500 mmol/L and preferably in the range of 5 to 100 mmol/L. For example, when the liquid reagent contains acids such as a carboxyl group, a sulfo group, and the like, it is preferable to use the buffer having a pKa lower than the pH thereof at the time of use among the buffers described above. On the other hand, for example, when the buffer contains alkalis such as an amino group and the like, is preferable to use the buffer having a pKa higher than the pH thereof at the time of use among the buffers described above.

The pH of the color-forming reagent is not particularly limited and is, for example, in the range of pH 3 to 12, preferably in the range of pH 4 to 10, and more preferably in the range of pH 5 to 9.

As described above, by causing the stabilizer of the present invention to be present with the color former, the color former can be stabilized. Therefore, according to the color-forming reagent of the present invention, the color former of the present invention can be stored stably until use. The storage period is not particularly limited. For example, when the color former is stored for more than 10 days, spontaneous color development is suppressed, and the color former can be stored more stably than ever before. The storage period is preferably within 20 years, more preferably within 4 years. In addition, when the color formers are stored as liquid color-forming reagents without causing the stabilizers of the present invention to be present with them, spontaneous color development occurs in about 20% to 90% of the color formers in about 10 days, for example. The storage temperature of the color-forming reagent of the present invention is not particularly limited, and is, for example, 40° C. or lower, preferably in the range of 0° C. to 30° C., and more preferably in the range of 2° C. to 10° C.

It is to be noted that, in the color-forming reagent of the present invention, although the stabilizer suppresses color development caused by a redox reaction during storage as described above, the concentration of the stabilizer is decreased by adding a specimen and the like as described above when using the color-forming reagent, and thus suppression of color development in use can be avoided sufficiently.

Further, the color-forming reagent of the present invention may contain, instead of the compound described in at least one of (1) and (2), the compounds described in (3) and (4). In this case, the color-forming reagent may contain the compound described in at least one of (1) and (2) besides the compounds described in (3) and (4), for example. The composition of the color-forming reagent is the same as described above, except that the compounds described in (3) and (4) are used.

<Stabilizing Method>

A stabilizing method of the present invention is a method for stabilizing the color former. The method includes causing the color former to be present with the stabilizer.

The form for causing the color former to be present with the stabilizer is not at all limited, and as described above, they may coexist in a liquid state or in a dry state. In addition, the ratio between the color former and the stabilizer to be added is also the same as described above. In addition, the stabilizing method of the present invention is achieved by using the stabilizer of the present invention or the color-forming reagent of the present invention, and the specific method is the same as described above.

<Storage Method>

A storage method of the present invention is a method for storing the color former. In this method, as described above, the color former is stored in the state of being stabilized by the stabilizing method of the present invention. In the present invention, it is only necessary that the color former is stored in the state where the stabilizer of the present invention coexists with the color former, and other forms or conditions are not at all limited. In addition, the ratio between the stabilizer and the color former to be added, a storage day, a storage temperature, and the like are also the same as described above.

<Kit for Conducting Color-Developing Reaction>

A kit for conducting a color-developing reaction of the present invention is a kit including the color former. The kit further includes the stabilizer of the present invention.

In the kit for conducting a color developing reaction of the present invention, the color former and the stabilizer may be mixed with each other in the liquid state or in the dry state as described above. In addition, in the kit for conducting a color-developing reaction of the present invention, the color former and the stabilizer may be contained in different containers. In this case, for example, the color former preferably is in the dry state. Further, for example, by dissolving or the like the color former in the dry state and the stabilizer in a solvent, the color former can be stored as a liquid reagent.

A reagent used for a color developing reaction of the color former is not particularly limited. As a specific example, a reagent containing an oxidase such as peroxidase (POD) or the like etc. is preferred, for example, when hydrogen peroxide is caused to generate from an objective substance to be detected, and a redox reaction (color-developing reaction) is conducted using the hydrogen peroxide and the color former as substrates. In addition, the reagent may contain various kinds of enzymes for causing hydrogen peroxide to be generated from the objective substance to be detected, for example, protease, oxidase, reductase, and the like. In addition to this, examples of the reagent include a buffer reagent, a solvent such as a buffer, and the like.

<Method for Measuring Objective Component>

A measuring method of the present invention is a method for measuring an objective component in a sample by detecting methylene blue, including the steps of (A) causing an oxidizing substance to be produced from the objective component in the sample;

(B) adding the color-forming reagent of the present invention to the sample;

(C) causing the methylene blue to be released from the color former by a redox reaction between the oxidizing substance and the color former in the color-forming reagent;

(D) measuring the presence or absence of production of the methylene blue or the amount of the produced methylene blue by detecting the released methylene blue; and (E) deciding the presence or absence of the objective component or the amount thereof in the sample from the measurement result.

The present invention is characterized by causing the color former to be present with the stabilizer of the present invention, and the other steps or conditions are not at all limited. That is, the present invention can be applied to every kind of measuring method (for example, qualitative method, quantitative method, or the like) including the step of causing methylene blue to be released from the color former and detecting the released methylene blue. Therefore, preferably, the present invention is, for example, applied to a method for determining an objective component qualitatively or quantitatively by causing methylene blue to be produced by a redox reaction and measuring the presence or absence of the methylene blue or increase or decrease in the amount of the methylene blue. In addition, the order of adding the color-forming reagent is also not particularly limited, and for example, the color-forming reagent may be added either before or after the step (A).

The methylene blue in the reaction system can be detected by an absorbance measurement as described above. Generally, the wavelength of maximum absorption of methylene blue is, for example, in the range of about 660 to 670 nm (for example, about 660 nm) and the detection wavelength thereof is, for example, in the range of 600 to 680 nm. In addition, when the pigment substance described in (2) is used as the stabilizer of the present invention, and the color former is present with the pigment substance in the reaction system, the spectrum of methylene blue can be shifted to the long-wavelength side, for example. Therefore, when the pigment substance described in (2) is used, it is possible to achieve measurement, for example, at 670 nm or higher, 680 nm or higher, and 690 nm or higher. The specific wavelength range is, for example, 610 to 730 nm, preferably 650 to 715 nm, and more preferably 660 to 700 nm.

The type of an objective component in the present invention is not limited at all as long as the measurement using the color former can be conducted. Examples of the objective component include a component from which an oxidizing substance can be produced by a redox reaction, and the like. In addition, when the objective component itself is an oxidizing substance, another oxidizing substance further may be caused to be produced from the objective component as described above, or for example, the step (A) is omitted, and in a step (B), the objective component itself as an oxidizing substance may be caused to react with the color former. Specific examples of the objective component include: glycated proteins such as glycated hemoglobin (Hb), glycated albumin, and the like; glycated peptides; glycated amino acids; glucose; uric acid; cholesterol; creatinine; sarcosine; glycerol; and the like.

Hereinafter, the present invention will be described further specifically with reference to examples. However, the present invention is not limited to these examples.

EXAMPLE 1

The color former generally shows a property of being degraded easily by light. Hence, with respect to the color formed, whether an increase in background absorbance by spontaneous formation of the methylene blue is stabilized (suppressed) by a pigment substance was checked under the coexistence of the pigment substance. As the color former, a product named "DA-67" (Wako Pure Chemical Industries, Ltd.) was used.

TABLE 1

| First reagent (R1-1) | |
|---|---|
| FPOX-CE (Kikkoman corporation) | 1.3 KU/L |
| POD | 5 KU/L |
| PIPES | 30 mmol/L (pH 7) |
| EMULGEN A-500 (Kao Corporation) | 0.05 g/L |
| n-dodecyl-α,β-D-maltoside | 2.5 g/L |
| tartrazine | 1 g/L |
| Second reagent (R2-1) | |
| pigment substance | 100 mg/L |
| metalloprotease (TOYOBO CO., LTD) | 1800 KU/L |
| $CaCl_2$ | 5 mmol/L |
| Tris-HCl | 70 mmol/L |
| MES | 30 mmol/L (pH 5.5) |
| hexadecyltrimethylammonium chloride | 0.2 g/L |
| DA-67 (Wako Pure Chemical Industries, Ltd.) | 0.03 mmol/L |

First, the second reagent was prepared and was stored for 30 days in a refrigerator with being exposed to light. In the second reagent, as the pigment substance, tartrazine (produced by Kishida Chemical Co., Ltd.), or a food additive "Food Yellow No. 4" (produced by Tokyo Chemical Industry Co., Ltd.) was used. These pigment substances are both the pigment substances described in (2) represented by the formula (I).

Next, the first reagent was prepared, and 78 μL of the first reagent was mixed with 13 μL of purified water. The resultant mixture was incubated at 37° C. for 5 minutes, and thereafter, 19.5 μL of the second reagent after being stored was added to the mixture. Further, the absorbance ($A_0'$) at a wavelength of 694 nm in the reaction solution immediately before the addition of the second reagent thereto and the absorbance ($A_5'$) at the wavelength of 694 nm in the reaction solution after 5 minutes from the addition of the second reagent thereto were measured with a biochemical automatic analyzer (product name "JCA-BM8": produced by JEOL Ltd.) and the difference ($A_5'-A_0'$) between $A_5'$ and $A_0'$ was determined. Further, as Comparative Example 1, measurement was conducted in the same manner using a second reagent containing no pigment substance. In addition, to compare equally an increase in background absorbance of the second reagent, a large amount of tartrazine was added to the first reagent.

TABLE 2

|  | Comparative Example 1 | Example 1 | |
| --- | --- | --- | --- |
|  | Pigment substance (—) | Pigment substance Tartrazine | Pigment substance Yellow No. 4 |
| 694 nm ($A_5'-A_0'$) | 0.159 | 0.125 | 0.129 |

As shown in Table 2, in Example 1 using the second reagent containing the pigment substance, the increase in absorbance (increase in background absorbance) at 694 nm could be suppressed as compared with Comparative Example 1 using the second reagent containing no pigment substance (–). That is, it can be said that, although the color former has the property of being degraded easily by light, light was blocked by adding the pigment substance to the second reagent, whereby spontaneous production of methylene blue was suppressed. Therefore, by causing the color former to be present with the pigment substance, the color former can be stored in the presence of moisture until use as described above, thus allowing the pigment substance to serve as a very useful reagent in the measuring method using the color former having low resistance to light.

EXAMPLE 2

With respect to the color former producing methylene blue by oxidation, the color former was irradiated with light in the presence of the pigment substance, and an effect of stabilizing the color former (suppression of spontaneous formation of methylene blue) by the pigment substance was checked (Color Former Solution)

The same DA-67 (product name) as used in Example 1 was used as the color former, and it was dissolved in 30 mmol/L MOPS-NaOH (pH7.6) so that its concentration became 0.05 mmol/L.

(Pigment Substance Solution)

Each of the following pigment substances was dissolved in purified water so that its concentration became 10 mmol/L.

All of the following pigment substances are pigment substances described in (2) represented by the formula (I).

No. 1 tartrazine
No. 2 food additive "Food Yellow No. 5"
No. 3 food additive "Food Yellow No. 2"

Samples (10 mL each) were prepared by mixing the color former solution, each of the pigment substance solutions, and purified water so that the color former would have a final concentration of 0.025 mmol/L, and each of the pigment substances would have a predetermined final concentrations (0.1 mmol/L, 0.2 mmol/L, and 0.4 mmol/L). Clear glass containers containing these samples, respectively, were left near a south-facing frosted glass for 1 hour from 15:00 to 16:00 to expose them to sunlight. The temperature was 25° C. After exposure, spectra of the samples were measured by a spectrophotometer (product name "V-550", produced by JASCO Corporation). In addition, as a control, measurement was conducted in the same manner using purified water instead of the pigment substance solution. With respect to the respective samples, the results of absorbance measurement at the wavelengths of maximum absorption corresponding to the respective pigment substances are shown in Table 3 below. The wavelengths of maximum absorption are 660 nm for No. 1 (tartrazine), 681 nm for No. 2 (Yellow No. 5), and 646 nm for No. 3 (Red No. 2). In addition, in Table 3, the maximum color-development absorbance is an absorbance at which methylene blue was produced from all the color formers contained in each of the samples. The production rate of methylene blue is a production rate of methylene blue after being exposed to light, which is represented by the rate of absorbance after being exposed to light assuming that the maximum color-development absorbance is 100%.

TABLE 3

| Sample | Pigment substance Type (No.) | Pigment substance Final concentration (mmol/L) | Absorbance (Abs.) Before exposure | Absorbance (Abs.) After exposure | Absorbance (Abs.) Maximum color-development absorbance | Methylene blue production rate (%) |
| --- | --- | --- | --- | --- | --- | --- |
| Control | — | — | 0.008 | 0.190 | 0.740 | 25 |
| 2-1 | 1 | 0.1 | 0.012 | 0.051 | 0.565 | 7 |
|  | 1 | 0.2 | 0.009 | 0.049 | 0.565 | 7 |
|  | 1 | 0.4 | 0.009 | 0.045 | 0.565 | 6 |
| 2-2 | 2 | 0.1 | 0.006 | 0.029 | 0.410 | 6 |
|  | 2 | 0.2 | 0.006 | 0.025 | 0.410 | 4 |
| 2-3 | 3 | 0.1 | 0.006 | 0.006 | 0.309 | 0 |
|  | 3 | 0.2 | 0.002 | 0.006 | 0.309 | 1 |
| 2-4 | 3 | 0.4 | 0.009 | 0.006 | 0.309 | −1 |

As shown in Table 3, when the color former was exposed to sunlight in the presence of the pigment substance, an increase in absorbance by exposure was suppressed as compared with the control containing no pigment substance. That is, by the pigment substance, production (spontaneous formation) of methylene blue from the color former was suppressed.

EXAMPLE 3

In the presence of tartrazine and quaternary ammonium salt as the stabilizer, the color former was stored, and an effect of stabilizing the color former (suppression of spontaneous formation of methylene blue) by the stabilizers was checked.

TABLE 4

| First reagent (R1-3) pH 7.0 | |
| --- | --- |
| MOPS | 30 mmol/L |
| Tris | 14 mmol/L |

TABLE 4-continued

| | |
|---|---|
| FPOX-CE (Kikkoman corporation) | 1.3 KU/L |
| $KNO_2$ | 4 mmol/L |
| tartrazine | 0.15 g/L |
| n-dodecyl-α,β-D-maltoside | 2.5 g/L | main wavelength of 694 nm and the sub-wavelength of 751 nm in the reaction solution after 5 minutes from the addition of the second reagent were measured with a biochemistry automatic analyzer (product name "JCA-BM8": produced by JEOL Ltd.) and the difference ($A_5-A_0$) was determined. These results are shown in the following Table 5.

TABLE 5

| | The second reagent | | | | | |
|---|---|---|---|---|---|---|
| | Stabilizer 1 | Stabilizer 2 Quaternary ammonium salt | | Background absorbance | | |
| | Pigment substance Tartrazine | Hexadecyl trimethyl ammonium | Dodecyl trimethyl ammonium chloride | $A_5 - A_0$ (Abs.) Storage period | | |
| No. | (g/L) | (g/L) | (g/L) | 0 day | 3 days | 7 days |
| A1 | 0.1 | 0.2 | — | 0.005 | 0.012 (+0.007) | 0.019 (+0.014) |
| A2 | 0.1 | 0.5 | — | 0.004 | 0.010 (+0.005) | 0.014 (+0.010) |
| A3 | 0.1 | 0.5 | — | 0.005 | 0.0014 (+0.009) | 0.024 (+0.019) |
| A4 | 0.1 | — | 1.0 | 0.005 | 0.0012 (+0.007) | 0.020 (+0.015) |
| A5 | 0.1 | — | 3.0 | 0.004 | 0.008 (+0.004) | 0.012 (+0.008) |
| A6 | 0.1 | 0.2 | 0.5 | 0.005 | 0.011 (+0.006) | 0.016 (+0.011) |
| A7 | 0.1 | 0.2 | 1.0 | 0.005 | 0.010 (+0.005) | 0.016 (+0.011) |
| A8 | 0.1 | 0.2 | 3.0 | 0.005 | 0.009 (+0.004) | 0.012 (+0.008) |
| C0 | 0.1 | 0.2 | — | 0.005 | 0.013 (+0.008) | 0.022 (+0.017) |

TABLE 4-continued

| | |
|---|---|
| POD | 10 KU/L |
| Second reagent (R2-3) pH 5.5 | |
| Tris-HCl | 63 mmol/L |
| Tris | 7 mmol/L |
| MES | 30 mmol/L |
| $CaCl_2$ | 5 mmol/L |
| DA-67 (Wako Pure Chemical Industries, Ltd.) | 0.03 mmol/L |
| Metalloprotease (TOYOBO CO., LTD) | 1800 KU/L |
| stabilizer 1 (tartrazine) | 0.1 g/L |
| stabilizer 2 | predetermined concentration |

First, the second reagent was prepared and was left for the predetermined periods (0 day, 3 days, and 7 days) at 25° C. In the second reagent, tartrazine was used as the stabilizer 1 and quaternary ammonium was used as the stabilizer 2. The tartrazine is a pigment substance described in (2) represented by the formula (I). Further, the quaternary ammonium is a compound described in (3), and hexadecyltrimethylammonium and dodecylhexadecylammonium chloride were used as the quaternary ammonium. The proportion of each stabilizer added in the second reagent is shown in the following Table 5.

Then, the first reagent was prepared, and 78 μL of the first reagent was mixed with 6.5 μL of purified water. The resultant mixture was incubated at 37° C. for 5 minutes, 19.5 μL of the second reagent that had been left was added to the mixture, and a color-developing reaction then was conducted at 37° C. Thereafter, the absorbance ($A_0$) at the main wavelength of 694 nm and the sub-wavelength of 751 nm in the reaction solution immediately before the addition of the second reagent that had been left (3 days and 7 days) or the second reagent that had not been left and the absorbance ($A_5$) at the As shown in Table 5, by causing the color former to be present with tartrazine and one or two types of quandary ammonium salt, no substantial increase in absorbance was observed during the storage of the second reagent containing the color former. From this fact, it was found that, by causing the color former to be present with tartrazine and quaternary ammonium salt, the spontaneous color development of the color former can be suppressed.

EXAMPLE 4

Storage of the second reagent and measurement of absorbance were conducted in the same manner as in Example 3 except that the following second reagent (R2-4) was used, and an effect of stabilizing the color former (suppression of spontaneous formation of methylene blue) by various kinds of stabilizers was checked.

In the following second reagent, tartrazine as the stabilizer 1 is the pigment substance described in (2) represented by the formula (I), and hexadecyltrimethylammonium as the stabilizer 2 is the quaternary ammonium. As the stabilizer 3, as shown in the respective Tables below, derivatives of β-cyclodextrin, which are described in (4), were used. In addition, the proportion of each stabilizer added in the second reagent is shown in the respective Tables below.

TABLE 6

| | |
|---|---|
| Second reagent (R2-4) pH 5.5 | |
| Tris-HCl | 63 mmol/L |
| Tris | 7 mmol/L |

TABLE 6-continued

| Second reagent (R2-4) pH 5.5 | |
|---|---|
| MES | 30 mmol/L |
| CaCl$_2$ | 5 mmol/L |
| DA-67 (Wako Pure Chemical Industries, Ltd.) | 0.03 mmol/L |
| Metalloprotease (TOYOBO CO., LTD) | 1800 KU/L |
| stabilizer 1 (tartrazine) | 0.1 g/L |
| stabilizer 2 (hexadecyltrimethylammonium) | 0.2 g/L |
| stabilizer 3 | predetermined concentration |

TABLE 7

| | The second reagent | | | | Background absorbance $A_5 - A_0$ (Abs.) Storage period | | |
|---|---|---|---|---|---|---|---|
| No. | Stabilizer 1 (g/L) | Stabilizer 2 (g/L) | Stabilizer 3 (β-cyclodextrins) (g/L) | | 0 day | 3 days | 7 days |
| D1 | 0.1 | 0.2 | 2-hydroxypropyl-β-cyclodextrin | 5.0 | 0.006 | 0.011 (+0.005) | 0.016 (+0.010) |
| D2 | 0.1 | 0.2 | 2-hydroxypropyl-β-cyclodextrin | 10 | 0.006 | 0.012 (+0.006) | 0.017 (+0.012) |
| D3 | 0.1 | 0.2 | 2-hydroxypropyl-β-cyclodextrin | 20 | 0.006 | 0.010 (+0.004) | 0.014 (+0.007) |
| D4 | 0.1 | 0.2 | 2-hydroxypropyl-β-cyclodextrin | 50 | 0.007 | 0.010 (+0.003) | 0.012 (+0.005) |
| D5 | 0.1 | 0.2 | β-cyclodextrin | 1.0 | 0.005 | 0.012 (+0.007) | 0.019 (+0.014) |
| D6 | 0.1 | 0.2 | β-cyclodextrin | 5.0 | 0.005 | 0.010 (+0.005) | 0.015 (+0.010) |
| D7 | 0.1 | 0.2 | β-cyclodextrin | 10 | 0.005 | 0.010 (+0.005) | 0.015 (+0.010) |
| D8 | 0.1 | 0.2 | maltosyl-β-cyclodextrin | 20 | 0.010 | 0.016 (+0.006) | 0.023 (+0.013) |
| D9 | 0.1 | 0.2 | glucosyl-β-cyclodextrin | 20 | 0.009 | 0.015 (+0.005) | 0.021 (+0.012) |
| D10 | 0.1 | 0.2 | glucuronyl Na* | 20 | 0.008 | 0.016 (+0.008) | 0.021 (+0.013) |

Stabilizer 1: tartrazine
Stabilizer 2: hexadecyltrimethylammonium
*glucuronylglucosyl-β-cyclodextrin As shown in Table 7, no substantial increase in absorbance upon storing the second reagent containing the color former in the presence of tartrazine, hexadecyltrimethylammonium, and any of β-cyclodextrins was observed.

TABLE 8

| | The second reagent | | | | Background absorbance $A_5 - A_0$ (Abs.) Storage period | | |
|---|---|---|---|---|---|---|---|
| No. | Stabilizer 1 (g/L) | Stabilizer 2 (g/L) | Stabilizer 3 (surfactant) (g/L) | | 0 day | 3 days | 7 days |
| E1 | 0.1 | 0.2 | n-dodecyl-α,β-D-maltoside | 1.0 | 0.005 | 0.010 (+0.005) | 0.014 (+0.009) |
| E2 | 0.1 | 0.2 | n-dodecyl-α,β-D-maltoside | 2.5 | 0.005 | 0.010 (+0.006) | 0.014 (+0.009) |
| E3 | 0.1 | 0.5 | n-dodecyl-α,β-D-maltoside | 2.5 | 0.005 | 0.009 (+0.004) | 0.013 (+0.008) |

Stabilizer 1: tartrazine
Stabilizer 2: hexadecyltrimethylammonium

As shown in Table 8, no substantial increase in absorbance upon storing the second reagent containing the color former in the presence of color former to coexist with tartrazine and n-dodecyl-α,β-D-maltoside was observed.

The storage of the second reagent and the measurement of absorbance were conducted in the same manner as in Example 3 except that, in the following Table 9, the pHs of F2, F3, and F4 were adjusted using MES, Tris, and Tris-HCl in the second reagent (R2-4), and the pHs of F5 and F6 were adjusted using MOPS, Tris, and MOPS-Tris.

content of Tris was 70 mmol/L and the content of IVIES (pKa) was 97 mmol/L in the second reagent (R2-4).

TABLE 10

| No. | The second reagent | | | Background absorbance $A_5 - A_0$ (Abs.) | | |
|---|---|---|---|---|---|---|
| | Stabilizer 1 (g/L) | Stabilizer 2 (g/L) | Stabilizer 3 (g/L) | Storage period | | |
| | | | | 0 day | 3 days | 7 days |
| G1 | 0.1 | 0.2 | HPβcD (pH 5.5) 20 | 0.008 | 0.011 (+0.003) | 0.017 (+0.009) |
| G2 | 0.1 | 0.2 | HPβcD 20 DDM 1 (pH 5.5) | 0.009 | 0.013 (+0.004) | 0.023 (+0.014) |
| G3 | 0.1 | 0.5 | HPβcD 20 DDM 1 (pH 6.5) | 0.007 | 0.008 (+0.001) | 0.012 (+0.005) |
| G4 | 0.1 | 0.5 | HPβcD 20 DDM 1 DDTMA 0.5 (pH 5.5) | 0.009 | 0.012 (+0.003) | 0.019 (+0.010) |
| G5 | 0.1 | 0.5 | HPβcD 20 DDM 1 DDTMA 0.5 (pH 6.5) | 0.007 | 0.008 (+0.001) | 0.013 (+0.006) |
| G6 | 0.1 | 0.2 | HPβcD 20 (pH 6.5) | 0.009 | 0.010 (+0.001) | 0.015 (+0.006) |

Stabilizer 1: tartrazine
Stabilizer 2: hexadecyltrimethylammonium
HPβcD: 2-hydroxypropyl-β-cyclodextrin
DDM: n-dodecyl-α,β-D-maltoside
DDTMA: dodecyltrimethylammonium

TABLE 9

| No. | The second reagent | | | | Background absorbance $A_5 - A_0$ (Abs.) | | |
|---|---|---|---|---|---|---|---|
| | Stabilizer 1 (g/L) | Stabilizer 2 (g/L) | Buffer | pH | Storage period | | |
| | | | | | 0 day | 3 days | 7 days |
| F1 | 0.1 | 0.2 | | 5.5 | 0.005 | 0.012 (+0.007) | 0.019 (+0.014) |
| F2 | 0.1 | 0.2 | MES-Tris | 6.0 | 0.005 | 0.012 (+0.007) | 0.018 (+0.013) |
| F3 | 0.1 | 0.2 | MES-Tris | 6.5 | 0.004 | 0.010 (+0.005) | 0.015 (+0.011) |
| F4 | 0.1 | 0.2 | MES-Tris | 6.9 | 0.004 | 0.009 (+0.005) | 0.013 (+0.009) |
| F5 | 0.1 | 0.2 | MOPS-Tris | 6.5 | 0.004 | 0.011 (+0.007) | 0.019 (+0.014) |
| F6 | 0.1 | 0.2 | MOPS-Tris | 6.9 | 0.004 | 0.010 (+0.006) | 0.016 (+0.012) |
| F7 | 0.1 | 0.2 | MOPS-Tris | 7.3 | 0.004 | 0.009 (+0.005) | 0.014 (+0.010) |

Stabilizer 1: tartrazine
Stabilizer 2: hexadecyltrimethylammonium

As shown in Table 9, it was found that spontaneous color development of the color former can be suppressed as the pH is set to be relatively higher (for example, about pH 7.2) in the presence of tartrazine and hexadecyltrimethylammonium.

With respect to G1, G2, G3, G4, and G5 in the following Table 10, storage of the second reagent and measurement of absorbance were conducted in the same manner as in Example 3 except that the pHs of them were adjusted to pHs shown in Table 10. Furthermore, with respect to G6, storage of the second reagent and measurement of absorbance were conducted in the same manner as in Example 3 except that the contents of Tris-HCl, Tris, and MES were set so that the As shown in Table 10, it was found that spontaneous color development of the color former can be suppressed even when β-cyclodextrins, n-dodecyl-α,β-D-maltoside, or trimethyleammonium are added in addition to tartrazine and hexadecyltrimethylammonium.

INDUSTRIAL APPLICABILITY

As described above, according to the present invention, since a color former is stabilized, thus allowing its spontaneous color development to be suppressed, it becomes possible to store the color former whose storage has been difficult. Thus, according to the method of the present invention, since stabilization of a color former allowing highly sensitive measurement can be improved, the range of application as a color former can be extended further than ever before. Therefore, for example, it can be said that the present invention is very useful, for example, in clinical examinations and the like.

The invention claimed is:

1. A method for stabilizing 10-(carboxymethylaminocarbonyl)-3,7-bis(dimethylamino)phenothiazine or a salt thereof, the method comprising
causing the 10-(carboxymethylaminocarbonyl)-3,7-bis (dimethylamino)phenothiazine or a salt thereof to be present with the following compounds (2) and (3):
(2) a compound represented by the following formula (I):

$$R^1—N=N—R^2 \quad (I)$$

wherein $R^1$ is

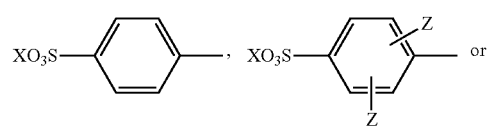

or

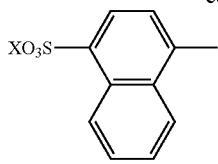

and R² is

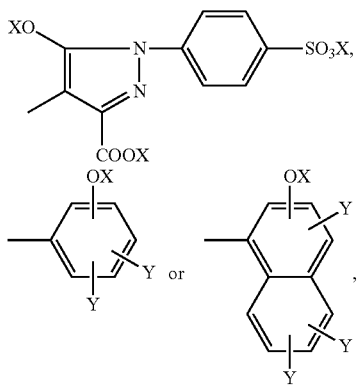

wherein
each X is independently hydrogen, halogen, sodium or potassium;
each Y is independently hydrogen or SO₃X; and
each Z is independently hydrogen, a methyl group or a methoxy group; and,
(3) a quaternary ammonium having a hydrocarbon group with a carbon number of 12 or higher or a salt thereof.

2. The stabilizing method according to claim 1, wherein the 10-(carboxymethylaminocarbonyl)-3,7-bis(dimethylamino) phenothiazine or a salt thereof is caused to be present with the stabilizer in a solvent.

3. The stabilizing method according to claim 1, wherein spontaneous color development of the 10-(carboxymethylaminocarbonyl)-3,7-bis(dimethylamino)phenothiazine or a salt thereof is prevented by the stabilizer.

4. A method for storing 10-(carboxymethylaminocarbonyl)-3,7-bis(dimethylamino)phenothiazine or a salt thereof, wherein the 10-(carboxymethylaminocarbonyl)-3,7-bis(dimethylamino)phenothiazine or a salt thereof is stored in a state of being stabilized by the stabilizing method according to claim 1.

* * * * *